United States Patent [19]

Hazel

[11] Patent Number: 5,228,745
[45] Date of Patent: Jul. 20, 1993

[54] CHILD OR INFANT CAR SEAT ASSEMBLY

[76] Inventor: Robert P. Hazel, Rte. 1, Box 601, Broad Run, Va. 22014

[21] Appl. No.: 913,725

[22] Filed: Jul. 16, 1992

[51] Int. Cl.$^5$ ............................................. A47C 27/00
[52] U.S. Cl. ................................... 297/229; 297/219
[58] Field of Search ............... 297/229, 218, 219, 220, 297/223, 224, 225, 231, 250, 254, 255, 266, 467, 487, 438, 455, 456, 457, 400, DIG. 6

[56] References Cited

U.S. PATENT DOCUMENTS

| | | |
|---|---|---|
| 1,216,287 | 2/1917 | Corbin . |
| 1,621,367 | 3/1927 | Hawkins . |
| 1,688,225 | 10/1928 | Belohlavek . |
| 3,054,637 | 9/1962 | Pambello . |
| 3,078,101 | 2/1963 | Reese ............................. 297/229 X |
| 3,501,197 | 3/1970 | Burton . |
| 3,792,897 | 2/1974 | Alson ................................. 297/219 |
| 4,033,622 | 7/1977 | Boudreau ........................... 297/250 |
| 4,198,716 | 4/1980 | Hollyday, III . |
| 4,205,877 | 6/1980 | Ettridge ......................... 297/250 X |
| 4,348,048 | 9/1982 | Thevenot ........................... 297/250 |
| 4,376,551 | 3/1983 | Cone ............................ 297/216 X |
| 4,383,713 | 5/1983 | Roston ............................... 297/219 |
| 4,385,782 | 5/1983 | Clark, Jr. . |
| 4,416,462 | 11/1983 | Thompson . |
| 4,565,405 | 1/1986 | Mayer . |
| 4,685,688 | 8/1987 | Edwards ....................... 297/250 X |
| 4,695,092 | 9/1987 | Hittie . |
| 4,707,024 | 11/1987 | Schräder ........................... 297/250 |
| 4,718,721 | 1/1988 | Pompa ........................... 297/229 X |
| 4,728,151 | 3/1988 | Neufeld . |
| 4,874,203 | 10/1989 | Henley . |
| 4,915,446 | 4/1990 | Darling et al. . |
| 4,926,512 | 5/1990 | Coyle ............................. 297/377 X |
| 5,007,676 | 4/1991 | Lien .............................. 297/219 X |
| 5,056,533 | 10/1991 | Solano ............................ 5/462 X |

Primary Examiner—Laurie K. Cranmer

[57] ABSTRACT

An insert for a child or infant car seat has at least a back portion, a seat portion and a leg portion. A child or infant can sit on the seat portion while his or her feet and legs will be supported by the leg portion. Use of the insert will prevent circulation in the child or infant's feet and legs from being cut off and can therefore extend the amount of time the car seat is continuously used. The inset will also increase the child or infant's comfort and will act as a protector for both the car seat and the seat of the vehicle. The portions of the insert can be a single, rigid, one-piece body or the back portion can be pivotal relative to the seat portion. The insert can include a detachable cover for the back and seat portions alone or for the back, seat and leg portions of the body. A cushion can be provided on the cover behind the leg portion of the body. This cushion will act as a support for the insert. Instead of a cushion, rigid side portions can be provided on the leg portions to act as a support. Adjacent the body, a headrest can be provided. The cover can enclose the head rest and will optionally have a head cushion for the child or infant's head.

21 Claims, 3 Drawing Sheets

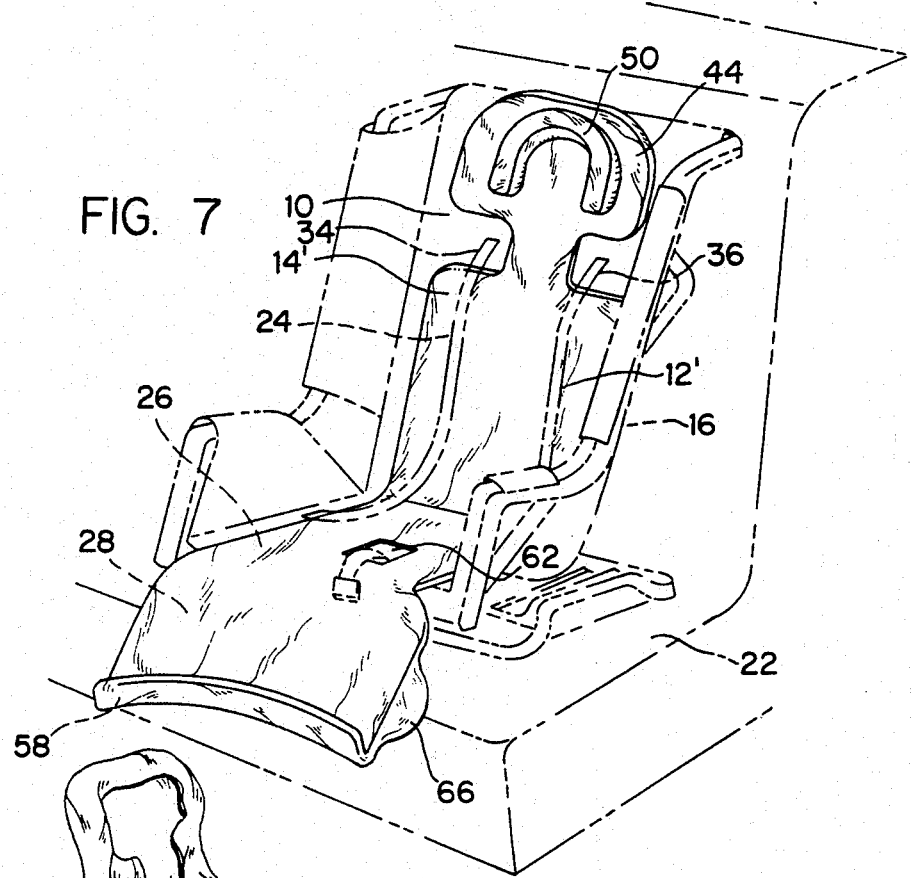
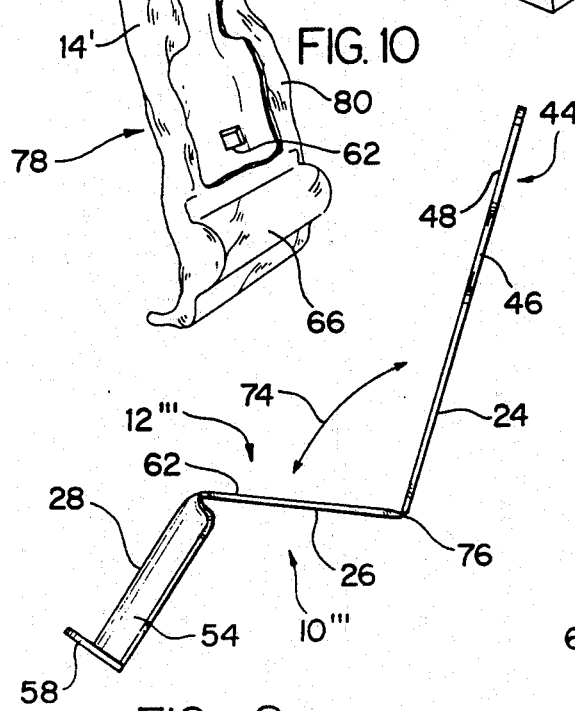
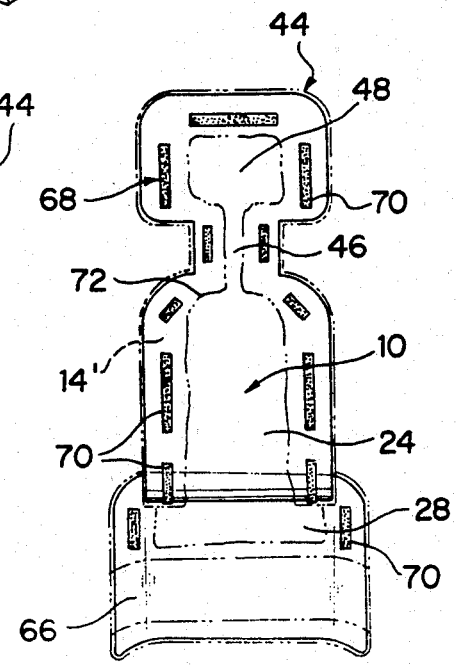

CHILD OR INFANT CAR SEAT ASSEMBLY

BACKGROUND OF THE INVENTION

1. Field of the Invention

The present invention relates to an insert for a child or infant car seat. The insert will support the child or infant's feet and legs and will prevent circulation in their feet and legs from being cut off.

2. Description of the Background Art

In conventional child car seats or infant seats, the child or infant's legs will dangle from the seat. This will cause circulation in the child's legs to be cut off. Pediatricians therefore recommend that these seats not be used for extended periods of time. Such conventional car seats are often uncomfortable for the child. Moreover, the child or infant car seat can get dirty over time and a need exists to provide some form of protection for the seat. Also, an infant or child's feet can scuff or otherwise mar the child or infant car seat as well as the vehicle seat. Snow, water or dirt on the child or infant's feet can dirty the child or infant car seat, or the vehicle seat.

Accordingly, a need in the art exists for a simple and effective insert for a car seat which will provide a leg rest for the child or infant. This device should be safe, easy to operate and inexpensive. Moreover, this device should provide some protection for the car seat as well as the vehicle seat.

SUMMARY OF THE INVENTION

Accordingly, it is a primary object of the present invention to provide an insert for a child or infant car seat which will provide a leg rest for the occupant, thereby preventing circulation in their feet and legs from being cut off.

It is another object of the present invention to provide an insert which can protect the car and vehicle seats from being kicked by the infant. This insert should also protect the car and vehicle seat from snow, water or dirt on the child or infant's shoes.

Yet another object of the present invention is to provide an insert which itself will not damage the car seat or vehicle seat.

Another object of the present invention is to provide an insert which can easily be placed into and removed from an existing child or infant car seat. To this end, it is desired to provide an insert which can be mounted in the car seat with one hand so that the child or infant can continue to be held while the insert is placed in the car seat.

Yet another object of the present invention is to provide an insert which can extend the period of continuous use for a car seat and thereby reduce the number of times it is necessary to remove the child or infant therefrom.

Yet another object of the present invention is to provide an insert with no or minimal moving parts to avoid possible harm to the child or infant and to make the insert less complicated.

Yet another object of the present invention is to provide an insert which is comfortable for the occupant but which will permit use of safety straps in the car seat to thereby securely hold the child or infant.

A further object of the present invention is to provide an insert with a removable cover. This cover can therefore be cleaned and will offer a cushioning effect for the child or infant. Such a cover can be removed during shipping or storage and if damaged or dirty, can be replaced by a new cover.

A further object of the present invention is to provide an insert with an optional headrest. This headrest can have a cover with a head cushion. Such a cushion will prevent an infant's head from turning from side to side and thereby provide a more enjoyable ride for the infant.

Yet another object of the present invention is to provide an insert which can be used in existing car seats without any modification thereto.

Yet another object of the present invention is to provide an insert embodiment which is bendable to reduce the size of the insert for shipping, packaging or storage.

A further object of the present invention is to provide an insert which is durable and long-lasting. This insert should be inexpensive to manufacture and should require limited to no maintenance.

Yet a further object of the present invention is to provide an insert which is not complicated and can be held in position merely by the weight of the child.

Yet another object of the present invention is to provide an insert which will accommodate children of different sizes.

A further object of the present invention is to provide an insert embodiment with a supporting piece which will prevent the insert from tipping from the car seat when placing a child therein. The supporting piece will also give added strength to a footrest portion of the insert.

These and other objects of the present invention are fulfilled by providing an insert for a child or infant car seat. The insert will have a back portion, a seat portion and a leg portion. The child or infant can sit on the seat portion while their feet and legs will be supported by the leg portion. This arrangement will prevent circulation in the child or infant's legs from being cut off.

Portions of the insert can be a single, rigid, one-piece body or the back portion can be pivotal relative to the seat portion. A cover can be provided for the insert. This cover will protect the insert as well as cushion the child or infant. Other optional features include a bulging cushion on the rear side of the cover adjacent the leg portion. This cushion will provide support for the leg portion against the car seat and/or vehicle seat. Alternatively, a rigid side portion can be provided on the leg portion instead of this cushion. The insert can also have a head portion. A head cushion can be provided on the cover at the head portion. Recesses are provided between the head portion and the back portion to accommodate the car seat's safety belts. An opening is also provided in the seat portion for receiving the safety strap from the car seat.

Further scope of applicability of the present invention will become apparent from the detailed description given hereinafter. However, it should be understood that the detailed description an specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention, and wherein:

FIG. 7 is a perspective view of the insert having a support cushion;

FIG. 8 is a side view of another embodiment of an insert with a pivotal back portion;

FIG. 9 is a rear view of the insert shown in FIG. 7; a

FIG. 10 is a rear view of the cover used with the insert shown in FIG. 7.

DETAILED DESCRIPTION OF THE PREFERRED EMBODIMENTS

Figure 1:
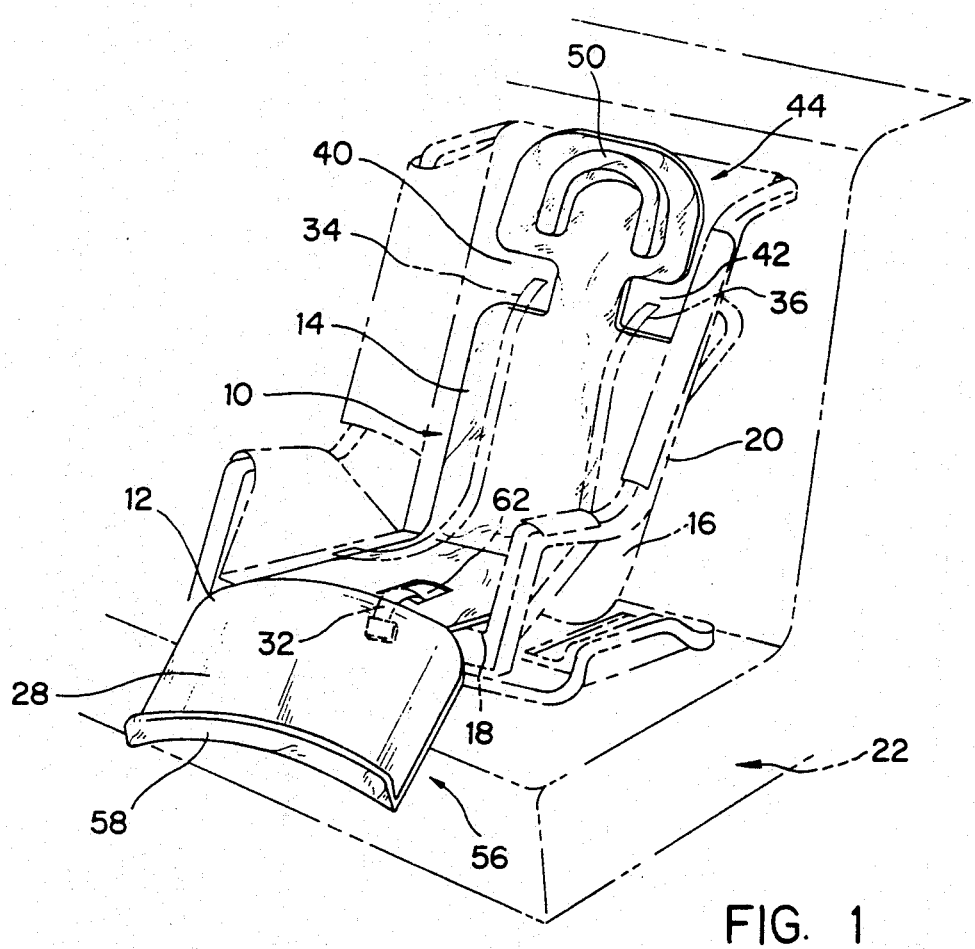
FIG. 1 is a perspective view of the insert of the present invention used in a child or infant car seat on a vehicle seat.

Referring in detail to the drawings and with particular reference to FIG. 1, an insert 10 of the present invention is shown. This insert 10 includes a body 12 with a cover 14. It is possible that the cover 14 can be omitted as will be described in more detail below.

The insert 10 is detachably mounted in a child or infant car seat 16. While a particular design for a car seat 16 has been shown, it should be appreciated that many different types of seats can be used. For example, the car seat could be a booster seat, toddler seat, or any other suitable seat.

The child or infant car seat 16 is normally placed or a vehicle seat 22. This vehicle can be a car, train, plane, or even simply a chair. It should be appreciated that the vehicle seat 22 and the child or infant car seat 16 are merely available conventional items. The insert 10 of the present invention requires no modification to either the car seat 16 or vehicle seat 22.

Figure 3:
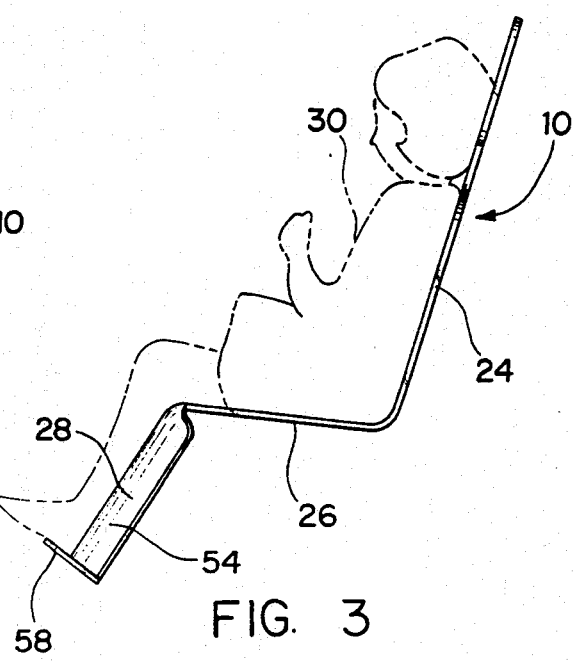
FIG. 3 is a view of the insert shown in FIG. 2.

The body 12 of the insert 10 has a back portion 24, a seat portion 26 and a leg portion 28. The seat portion 26 will rest on the seat section 18 of the car seat 16. The back portion 24 of the insert 10 will rest against the back section 20 of the car seat 16. An occupant 30 of the car seat will simply sit on the seat portion 26 of the insert 10 as shown in FIG. 3. The occupant's legs will rest against the leg portion 28. This leg portion 28 will provide support for the occupant's leg such that circulation will not be cut off. In this manner, cramps will be avoided and comfort for the occupant of the car seat 16 will increase. The car seat 16 can therefore be used for longer periods of time. The need for removing the child or infant from the car seat can therefore be reduced. Because the insert 10 is used with a child or infant car seat 16, the occupant 30 will normally be a child or infant.

The car seat 16 has safety straps 32 and safety belts 34, 36. An Opening 62 is provided in the seat portion 26 to accommodate the safety strap 32. Recesses 40, 42 are provided for the safety belts 34, 36 respectively. The safety strap 32 and safety belts 34, 36 are normally provided in the car seat 16. While a buckling arrangement for the strap 32 and belts 34,36 is not shown, it should be readily appreciated that they can easily be hooked together after the occupant 30 has been placed on the insert.

Figure 2:
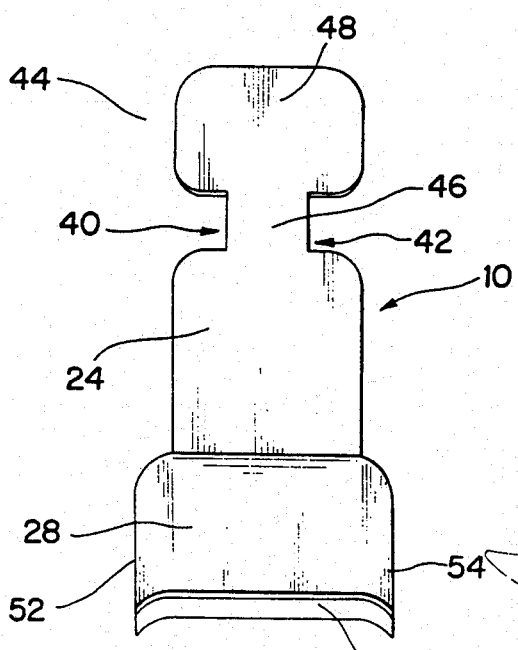
FIG. 2 is a front view of the insert shown in FIG. 1 with the cover removed.

No modification to the car seat 16 is needed when the instant insert 10 is used. The insert 10 will normally be positioned between the car seat 16 and occupant 30. The insert 10 shown in FIG. 1 has a headrest 44. As indicated in FIG. 2, this headrest 48 is comprised of a neck portion 46 and a head portion 48. The neck portion 46 is located between the head portion 48 and the back portion 24 of insert 10. Because the width of the neck portion 46 is less than the width of the head portion 48 and back portion 24, the recesses 40 and 42 are provided. These recesses 40 and 42 accommodate straps 34, 36 as noted above.

The headrest will rigidly be attached to the back portion 24. In the arrangement shown in FIGS. 1-3, the insert 10 is an integral, unitary, one-piece structure with the back portion 24, seat portion 26, leg portion 28 and headrest 44. This insert 10 can be molded from plastic or formed from a single sheet of metal. Normally, however, plastic will be used but it should be recognized that any suitable material can be used.

Because this insert 10 is a one-piece structure, it is relatively easy to handle. An adult can mount the insert 10 on the car seat 16 with one hand. Therefore, the adult can hold the child or infant while placing the insert 10 in the car seat 16. The instant insert 10 is relatively easy to use. Moreover, this insert 10 is relatively inexpensive to manufacture such as from a single piece from plastic, for example.

The cover 14 over the headrest 44 shown in FIG. 1 has a head cushion 50. While a crescent shape cushion 50 is indicated in FIG. 1, it should be appreciated that any type of cushion can be used. This head cushion 50 can be detachable from the cover 14 or can be permanently affixed thereto. The head cushion 50 will normally cushion the occupant's head. If the insert 10 is used as an infant car seat, this can be especially beneficial because the head cushion 50 will prevent the infant's head from turning from side to side.

Because the head cushion 50 is either permanently affixed to cover 14 or can be mounted thereon (such as by snaps or Velcro ®, hook-and-loop fasteners), little assembly is required. An adult can simply place the insert 10 in the car seat 16 and then strap the child or infant in position. There is no need to then place some form of cushion around the child's head because the head cushion 50 is already in position.

As indicated in FIGS. 2 and 3, the cover 14 can be removed from the body 12. Accordingly, the insert 10 of the instant invention can be used with or without the cover 14. When the cover is used, the front side will normally be positioned between the body 12 and the occupant 30.

In FIG. 1, the cover 14 terminates before the leg portion 28. Because a child's shoes may be dirty, they will simply rest on the material of leg portion 28. The number of times the cover 14 needs to be cleaned would therefore be reduced. If the insert 10 is made from plastic, any dirt on the leg portion 28 could simply be wiped therefrom. As will be discussed later, this cover 14, however, can cover or enclose the leg portion 28 of the body 12.

The leg portion 28 shown in FIGS. 1-3 is bowed from side to side. This will provide added strength for the leg portion 28. Each side 52, 54 of the leg portion 28 will be bent downwardly. Therefore, these sides 52, 54 will stiffen the leg portion 28 and will provide added rigidity. Of course, the leg portion 28 can omit these extremely curved sides 52, 54. Also, the leg portion 28 can be flat rather than bowed from side to side. Due to the bowing of the leg portion 28, it will have a generally crescent shape (except for the side portions 52, 54) when viewed from the end. The side portions 52, 54 continue the curve direction for the leg portion 28 but are angled so that the diameter of this curved shape is lessened.

The leg portion 28 has a footrest 58 at the end thereof as shown in FIGS. 1-3. This footrest 58 can be omitted from the body 12 if so desired. The footrest 58 is bowed similarly to the leg portion 28. However, if a flat, non-bowed leg portion 28 is used, this footrest 58 can be generally straight.

Together, the footrest 58 and leg portion 28 form a rest means 56. This rest means 56 will engage the feet and at least a portion of the child or infant's legs. The leg portion 28 of the footrest 56 will prevent blood circulation in the child or infant's feet and legs from being cut off as discussed above. The footrest 58 is located at a end of the leg portion 28 distal from the seat portion 26. This footrest 28 can be an integral, one-piece structure with the leg portion 28, seat portion 26, back portion 24, and optional headrest 44.

In the embodiment shown in FIGS. 1-3, the insert 10 is a rigid, non-flexible, one-piece structure. The seat portion 26 is generally perpendicular to the back portion 24. The leg portion 28 is inclined with respect to the seat portion 26 at a downward angle. The footrest 58 is generally perpendicular to the surface of the leg portion 28. Of course, other angles can be used for the instant insert 10. It is merely necessary that this insert 10 easily be accommodated in existing car seat 16.

By providing the footrest 58, water, snow or dirt on the infant or child's shoes can be guided away from the car seat 16 and vehicle seat 22. This will prevent damage and/or dirtying of these seats. Moreover, if the child or infant kicks while in the car seat 16, the leg portion 28 will protect both the car seat 16 and vehicle seat 22. Due to the provision of bent sides 52, 54, the leg portion 28 can easily hold its position even if strongly kicked by the occupant.

While the occupant 30 in FIG. 3 has his or her feet against the footrest 58, it should be recognized that it is not necessary for these feet to actually engage the footrest 58. In other words, the insert 10 of the instant invention can be used with children of many different sizes. However, if very small or large children are to use this insert 10, an appropriately size insert 10 can, of course, be selected.

The insert 10 shown in FIGS. 1-3, for example, has no moving parts. Therefore, it is unlikely that the infant, child or adult will get their fingers pinched when using this insert. Danger to the occupant is avoided. This insert will not collapse but will safely hold the child or infant.

Moreover, all edges of the insert 10 are rounded, thereby improving safety of the device. The child or infant will not be scratched. The bowing of the sides 52, 54 of the leg portion 28 will also prevent the child or infant's legs from being hit against a sharp edge of the leg portion 28 when the child or infant is placed in the car seat 16.

Figure 4:
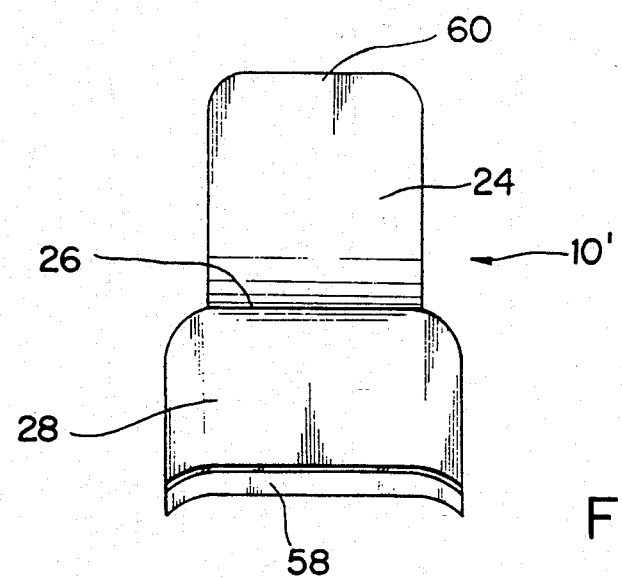
FIG. 4 is a front view of another embodiment for an insert without a head portion.

Turning now to FIG. 4, another embodiment of the insert 10' is shown. This insert 10 does not have a cover 14 but it should be appreciated that a cover could be included thereon. Such a cover 14 would cover the back portion 24 and seat portion 26 or the back portion 24 and seat portion 26 and leg portion 28. If the leg portion 28 is covered, the footrest 58 can be covered or this footrest can be exposed. A similar arrangement for the cover can, of course, be used in the above-discussed embodiment shown in FIGS. 1-3.

The insert 10' of FIG. 4 differs from the insert of FIGS. 1-3 because the headrest 44 has been omitted. Rather, a flat top edge 60 is provided. The optional cover 14 can enclose this edge 60 or the edge 60 can be exposed. The child or infant's head can simply rest against the car seat 16 in this arrangement.

Figure 5:
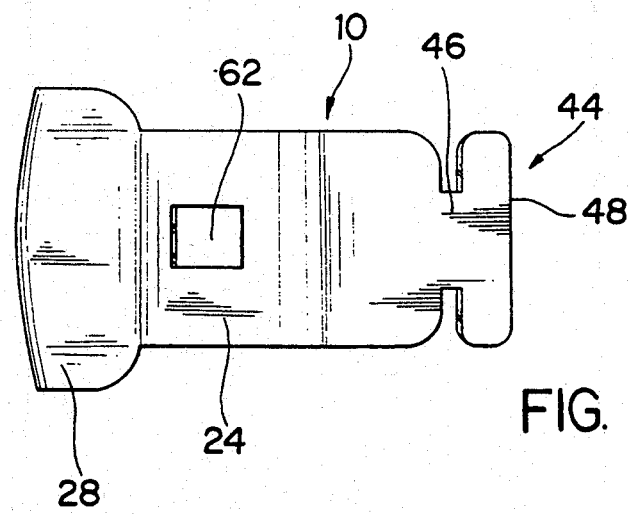
FIG. 5 is a top plan view of the insert shown in FIG. 2.

In FIG. 5, a bottom plan view of the insert 10 of FIGS. 1-3 is shown. This insert 10 does not have a cover 14. The opening 62 for the safety strap 32 is shown in this figure. When placing the insert 10 on the car seat 16, the size of the opening 62 is sufficient to accommodate the safety strap 32. Any configuration for this opening 62 can be used. Except for this opening 62, the body 12 is generally a solid, uninterrupted structure.

Figure 6:
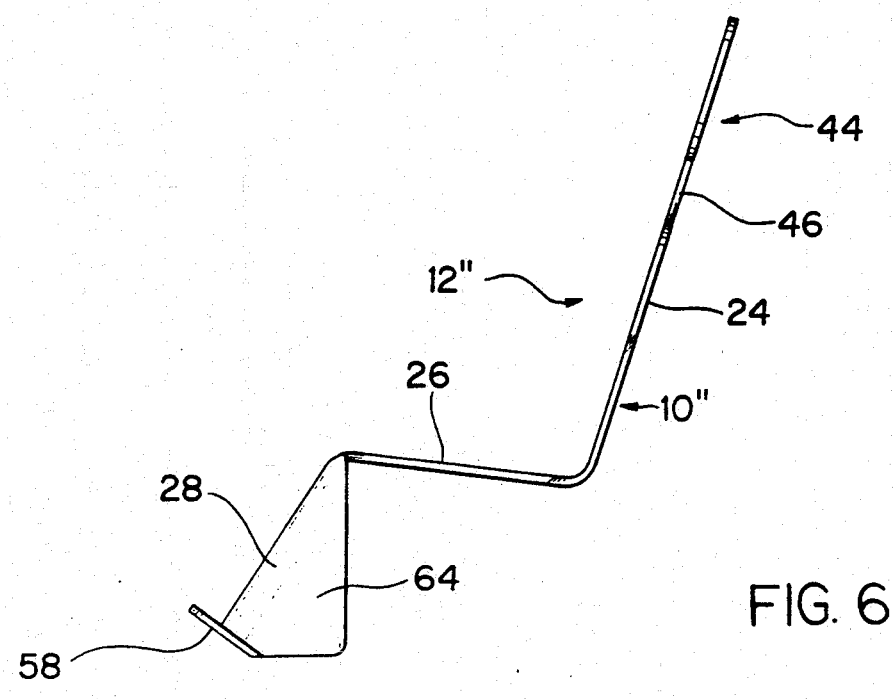
FIG. 6 is a side view of another embodiment of the insert having rigid side portions adjacent the leg portion.

In FIG. 6, a third embodiment of the insert 10" is shown. This body 12" of insert 10" is similar to the insert 10 of FIG. 1 because a headrest 44 is provided. However, the sides 52 and 54 of the leg portion 28 are replaced by rigid side portions 64. While FIG. 6 only shows one side of the insert 10", it should be appreciated that a corresponding rigid side portion insert is provided on the opposite side of the leg portion 28. Thus, the right and left side views of the insert 10" would be mirror images.

Instead of providing two separate rigid side portions 64, it is also possible to provide a single rigid portion extending beneath the leg portion 28. Such a single rigid piece could extend completely across the leg portion 28 or can be of a lesser or greater length than the leg portion 28.

By providing the rigid side portions 64 as seen in FIG. 6, the rigidity of the leg portion 28 is increased. Therefore, if a larger child were to sit on the insert 28, it is less likely that the car seat 16 or vehicle seat 22 would be damaged if this child kicks against the insert. Of course, any size child can be accommodated in the various inserts provided the inserts are sufficiently sized.

The rigid side portion 64 will generally rest against the car seat 16 alone or the car seat 16 and the vehicle seat 22. This arrangement will also prevent the insert 10" from tipping when the child or infant is placed thereon. This insert 10" of FIG. 6 is shown without a cover 14, but it should be appreciated that such a cover can be used. The insert 10" of FIG. 6 is merely placed on the car seat 16. The strap 32 is then fed through the opening 62 and the child is placed on the insert 10". The child can then be strapped in position and the car seat used in the above-discussed embodiments.

Turning now to FIG. 7, an insert 10 similar to the arrangement of FIG. 1 is shown. However, the cover 14' of this arrangement is slightly different. The back portion 24, seat portion 26 and leg portion 28 are under this cover 14'. The insert 10 with this cover 14' will be positioned in the car seat 16 similarly to the arrangement of FIG. 1. The car seat 16 will also rest on the vehicle seat 22 similarly to the arrangement of FIG. 1. There is no difference between the car seat 16 and vehicle seat 22 shown in FIGS. 1 and 7. As noted above, any existing car seat 16 can be used with the instant insert 10.

The cover 14' of the FIG. 7 arrangement includes a bulging cushion 66. This bulging cushion 66 is positioned between the leg portion 28 and the vehicle seat 22. Of course, if a different type of car seat 16 is used, this cushion 66 could engage the car seat 16 itself. The bulging cushion 66 will provide added support for the leg portion 28 similar to the rigid side portion 64 shown in FIG. 6. However, the bulging cushion 66 is generally flexible and soft like the cover 14'. Therefore, scratching of the car seat 16 or vehicle seat 22 by this cushion 66 can be avoided.

The cover 14' shown in FIG. 7 encloses the footrest 58 and a majority of the leg portion 28. The rear side of this cover 14' on insert 10 is shown in FIG. 9 in dotted lines. In this manner, the attachment means 68 can be seen. In FIG. 9, the attachment means 68 includes a plurality of Velcro ®, hook-and-loop fasteners. A plurality of such fasteners 70 are provided around the periphery of the insert 10. Because the cushion 14' encloses a majority of the leg portion 28, such fasteners 70 are not needed around the periphery of the leg portion. To insert the cover 14' on the insert 10, the cover will first be placed over the leg portion 28. Then the remaining portion of the cover 14' can be placed around insert 10 and the fasteners 70 on insert 10 can be affixed to the other fasteners on the cover 14'. Gathered portions can be provided on the rear of cover 14' to allow for expansion of the cover as it is placed on insert 10. Elastic lining 72 can also be provided around the periphery of the opening of the cover 14' in order to accommodate expansion and retraction of the cover 14' as it is placed on the insert 10. Of course, slits could be provided on the rear side of this cover 14' to aid in placing the cover 14' on insert 10 or the cover 14' could simply be of a material which would stretch over the insert 10.

Apart from hook-and-loop fasteners 70, it is possible to use any number of fasteners. For example, snaps, buckles or zippers or some combination thereof can be used. Alternatively, the cover 14' can be permanently affixed to the insert 10 such as by gluing. Moreover, this cover 14' can be manufactured to completely enclose the insert 10. Such a cover completely enclosing insert 10 can be made with a zipper or other arrangement to allow removal of the cover from the insert 10. Alternatively, such an insert can be permanently affixed on and completely enclosing the insert 10.

However, it is preferred that the cover be detachably mounted on insert 10. In that way, the cover can be removed for washing. If a cover gets dirty or ragged over time, it can simply be removed and a new cover used. If the cover has a detachable head cushion 50 and no bulging cushion 66, it would also be possible to simply mount another new cover over an existing cover. Therefore, many different covers 14' can be used. Also, the foregoing comments about covers 14' are equally applicable to cover 14.

The cover 14 or 14' of the instant invention can be made from plastic, terry cloth, or any suitable material. It is preferable that the cover be soft to enhance the comfort for the infant or child. Moreover, it is preferable that this material be machine washable so that it can easily be cleaned if it gets dirty.

In FIG. 10, the cover 14' is shown without insert 10. As can be seen, the bulging cushion 66 is an integral part of the cover. Therefore, this cover 14' and bulging cushion 66 are a one-piece structure. Alternatively, the cover 14 can be made without the bulging cushion 66 or a detachable bulging cushion 66 can be used.

A final insert 10''' is shown in FIG. 8. The body 12'''' of this insert 10''' has a back portion 24, seat portion 26 and leg portion 28. The insert 10''' shown in FIG. 8 is similar to the arrangement shown in FIG. 1 except this insert 10''' is pivotal as indicated by arrow 74 about joint 76. Therefore, the headrest 44 and seat portion 26 can be folded for storage, shipping or packaging. The back portion 24 can engage the seat portion 26 when in the folded position. Of course, the headrest 44 can be omitted in this embodiment. Moreover, the sides 52, 54 can be replaced by rigid side piece portions 64 as discussed with regard to the embodiment of FIG. 6.

Other than the pivotal joint 76 of this insert 1''' of FIG. 8, the insert 10''' is a rigid structure. The seat portion 26 and leg portion 28 are non-flexible, rigid one-piece structures. The optional footrest 58 can also be an integral, one-piece structure with the leg portion 28 and seat portion 26. Likewise, the optional headrest 44 with the neck portion 46 and head portion 48 can be an integral, one-piece structure with the back portion 24. This insert 10''' of FIG. 8 has minimal moving parts. Therefore, pinching of a child's fingers and the like will continue to be avoided. This insert 10''' is very safe. The insert 10''' of FIG. 8 will only have an opening 62 for the safety strap 32. Recesses can be provided on each side of the neck portion 46 to accommodate safety belts. Minimal openings may also be provided along the length of the joint 76. Apart from these minimal openings as well as the opening 62, this insert 10''' is a generally solid, uninterrupted structure. While the insert 10''' of FIG. 8 does not have a cover, it should be appreciated that any of the above-discussed covers can be used with insert 10'''.

The instant insert of the present invention will extend the time permissible for continuous use of existing child or infant car seats. This insert will prevent circulation in the child or infant's feet and legs from being cut off. Comfort for the child will be increased. The optional cover will also provide a cushioning effect for the child to further increase his or her comfort. This cover is removable and cleanable and can be sold separately from the insert 10, 10', 10'', or 10'''. The insert of the instant invention can have an optional headrest with or without a head cushion on the cover. Such a head cover is especially helpful to prevent an infant's head from rolling from side to side.

The insert 10, 10', and 10'' of FIGS. 1, 4 and 6 have no moving parts while the insert 10''' of FIG. 8 only has a pivoting joint 76. Therefore, no or minimal moving parts are provided in the instant invention. The danger of injury to the child or adult using this insert is avoided. The size requirements for shipping, packaging or storing of the insert can be reduced with the pivotal insert 10''' of FIG. 8.

All embodiments of the instant insert of the present invention fit in existing car seats. There is no need for any modification to the car seat or to the vehicle seat. No restraints are placed on the occupant of the car seat other than the normal safety strap 32, and safety belts 34, 36. Therefore, use of the instant insert is not uncomfortable for the child or infant.

The insert of the present invention is easy to use. There is no complicated folding or other assembly. It is merely necessary to sit the insert into the car seat 16. The child or infant can then be placed in the car seat and strapped in position.

With the leg portion 28 of the insert, the car seat 16 and vehicle seat 22 can be protected. Not only will these items be protected from snow, water or dirt on the child's feet or shoes, but they will also be protected from kicking by the child or infant.

The instant insert is durable and long-lasting. The weight of the child will simply hold the insert in position. No complicated assembly or hold-down mechanisms are therefore necessary. Due to the simplicity of the insert, it can be used with children of many different sizes. For example, an insert which is slightly larger than the user's child or infant can be purchased. The insert can continue to be used as the child grows.

The insert of the instant invention can have a plurality of rigid side portions 64 or a single rigid portion or bulging cushion 66 as discussed above. This will not only strengthen the leg portion 28 but will prevent the insert from tipping as the child is placed therein.

The insert of the present invention does not have sharp exposed edges. Due to the rounded edges, injury to the child, infant or adult can be avoided.

The headrest 44 of the instant insert can be omitted if so desired. It would therefore be less expensive to manufacture and would require less space for shipping, storage or packaging. Moreover, it would be unnecessary to feed safety belts 34, 36 into recesses 40, 42.

The insert of the present invention can also be made with the optional footrest 58. This footrest 58 serves as a lip to collect snow, rain or dirt, keeping it from the car seat 16 and vehicle seat 22.

The instant insert has many advantages as a child or infant's car seat accessory. Limited to no maintenance is required, the insert is easy to clean and care for, and the insert is relatively inexpensive.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An insert for a seat, the seat being one of a child car seat and an infant car seat, the seat having a back section and a seat section and at least one strap for holding an occupant on the insert in the seat, the insert comprising:
a single, unitary, one-piece body, the body being positionable between the seat and the occupant thereof, the body including rest means for engaging feet and at least a portion of an occupant's legs, the rest means comprising a leg portion, the body further comprising a seat portion and a back portion, the seat portion being located between the back portion and the leg portion, the body having a front side and a rear side and also including means for engaging a majority of the rear side of the back portion and the seat portion with the seat such that a majority of an area of the body is engaged with and supported by the seat, the means for engaging comprising both the seat portion and the back portion being generally planar and sized to fit within the seat, the one-piece body being rigid such that the back portion, the seat portion and the leg portion are non-movable with respect to each other and the seat portion and the back portion being inclined with respect to one another such that the seat portion and the back portion are generally located in different planes, the rear side of the body faces the seat and the rear side of the body being free of any connections between the body and the seat such that the body freely sits on the seat and is readily removable therefrom when the at least one strap is disengaged from holding the occupant on the insert, the body being held on the seat when the strap is holding the occupant, the rear side of the back portion also being without any structure attached thereto such that the rear side of the back portion directly abuts the seat.

2. The insert as recited in claim 1, wherein the body is formed from one of a single piece of plastic and a single sheet of metal, a first angled connection being provided between the leg portion and the seat portion and a second angled connection being provided between the seat portion and the back portion, the seat portion being generally in a plane generally perpendicular to a plane in which the back portion is located.

3. The insert as recited in claim 1, wherein the leg portion is bowed and wherein the leg portion is inclined with respect to the seat portion.

4. The insert as recited in claim 3, wherein the rest means further comprises a footrest, the footrest being at an end of the leg portion distal from the seat portion.

5. The insert as recited in claim 1, wherein the rest means further comprises a footrest, the footrest being at an end of the leg portion distal from the seat portion.

6. The insert as recited in claim 1, wherein the body is a generally solid, uninterrupted structure without openings therein except for an opening in the seat portion on a side close to the leg portion, a safety strap of the seat being insertable through the opening in the seat portion.

7. The insert as recited in claim 1, further comprising a cover for the body, the body having a front side and a rear side, the cover enclosing the front side of the body for at least the seat portion and back portions thereof.

8. The insert as recited in claim 7, wherein the cover is a flexible material, the insert further comprises attachment means positioned on the rear side of the body for attaching the cover to the body.

9. The insert as recited in claim 8, wherein the cover further encloses the front side and a majority of the rear side of the body at the leg portion thereof, the cover having an opening through which the body can be inserted.

10. The insert as recited in claim 9, wherein the cover on the rear side of the body at the leg portion has a bulging cushion, the cushion being generally smooth and extending longitudinally across the leg portion of the body, the cushion being spaced from a lower edge of the leg portion and being flexible.

11. The insert as recited in claim 1, further comprising a cover for at least a front side of the body, the cover enclosing a majority of the leg portion of the body, the cover further having a bulging cushion integral therewith, the cushion extending longitudinally across a rear side of the leg portion and being spaced from a lower edge of the leg portion.

12. The insert as recited in claim 1, wherein the leg portion further comprises rigid side portions on both outer edges thereof, the rigid side portions each having a generally triangular shape and extending in a rearward direction beneath the leg portion.

13. The insert as recited in claim 1, further comprising a headrest attached to the back portion on an end distal from the seat portion, the headrest being a part of the integral, one-piece body.

14. The insert as recited in claim 13, wherein the headrest comprises a neck portion and a head portion, the neck portion being between the head portion and the back portion, a width of the neck portion being less than a width of the head portion and less than a width of the back portion of the body, the head portion being generally centered between sides of the body portion, two recesses being formed on each side of the neck portion between the head portion of the headrest and the back portion of the body, safety belts of the seat being positionable within each of the recesses.

15. The insert as recited in claim 13, further comprising a cover for at least a front side of the body, the cover overlying a front side of at least the seat portion of the body, the back portion of the body and the headrest.

16. The insert as recited in claim 15, further comprising a head cushion provided on the cover at an area overlying the head portion of the headrest, an occupant's head being engageable with the head cushion.

17. An insert for a seat, the seat being one of a child car seat and an infant car seat, the seat having a back section and a seat section and at least one strap for holding an occupant on the insert in the seat, the insert comprising:
a body positionable between the seat and the occupant thereof, the body having a front side and a rear side and including rest means for engaging feet and at least a portion of an occupant's legs, the rest means comprising a leg portion, the body further comprising a seat portion and a back portion, the seat portion being located between the back portion and the leg portion, the leg portion being rigidly attached to the seat portion and the body including means for pivoting the back portion relative to the seat portion and including means for engaging a majority of the rear side of the back portion and the seat portion with the seat such that a majority of an area of the body is engaged with and supported by the seat, the means for engaging comprising both the seat portion and the back portion being generally planar and sized to fit within the seat, the leg portion and seat portion being a generally solid, uninterrupted structure without openings therein except for an opening in the seat portion on a side close to the leg portion, a safety strap of the seat being insertable through the opening in the seat portion, the leg portion being inclined with respect to the seat portion, the rear side of the body faces the seat and the rear side of the body being free of any connections between the body and the seat such that the body freely sits on the seat and is readily removable therefrom when the at least one strap is disengaged from holding the occupant on the insert, the body being held on the seat when the strap is holding the occupant, the rear side of the back portion also being without any structure attached thereto such that the rear side of the back portion directly abuts the seat.

18. The insert as recited in claim 17, wherein the seat portion and the leg portion are an integral, unitary, one-piece structure.

19. The insert as recited in claim 17, further comprising a headrest attached to the back portion at an end distal from the seat portion, the head rest and back portion being an integral, unitary, one-piece part of the body, the headrest including a neck portion and a head portion, the neck portion being between the head portion and the back portion, a width of the neck portion being less than a width of the head portion and a width of the back portion, the head portion being generally centered between the sides of the head portion and sides of the body portion, two recesses being formed on each side thereof between the head and back portions, safety belts of the seat being positionable within each of the recesses.

20. A cover for covering a body for one of a child car seat and an infant car seat, the body having a back portion, a seat portion and a leg portion and each portion having a front side and a rear side, the seat portion being between the back portion and the leg portion and the body being positionable between the seat and an occupant thereof, wherein the cover further comprises a front face covering a front side of the body, the cover being detachably mountable on the body, the front face of the cover being positionable between the body and an occupant of the seat, the cover further comprising means for enclosing a majority of the leg portion of the body when the cover is on the body, the means for enclosing includes a pouch formed by a rear face and the front face of the cover, the rear face being integral with the front face of the cover such that the front face and rear face of the cover are a single structure, the cover being without any fixed connection to the leg portion such that the leg portion is readily removable from the pouch, the cover further comprises a bulging cushion, the cushion being on the rear face of the cover and extending longitudinally across a rear side of the leg portion when the cover is on the body, the cushion being spaced from a lower end of the cover, the cushion being a means for supporting the body when the cover is on the body and the body is in the seat and the cover and cushion being flexible when the cover is removed from the body, the bulging cushion being located on the rear face of the pouch such that the bulging cushion is located between the rear side of the body and the seat.

21. An insert for a seat, the seat being one of a child car seat and an infant car seat, the seat having a back section and a seat section, the insert comprising:
a single, unitary, one-piece body, the body being positionable between the seat and an occupant thereof, the body including rest means for engaging feet and at least a portion of an occupant's legs, the rest means comprising a leg portion, the body further comprising a seat portion and a back portion, the seat portion being located between the back portion and the leg portion, the one-piece body being rigid such that the back portion, the seat portion and the leg portion are non-movable with respect to each other, the insert further comprises a headrest attached to the back portion on an end distal from the seat portion, the headrest being a part of the integral, one-piece body, the headrest comprises a neck portion and a head portion, the neck portion being between the head portion and the back portion, a width of the neck portion being less than a width of the head portion and less than a width of the back portion of the body, the head portion being generally centered between sides of the body portion, two recesses being formed on each side of the neck portion between the head portion of the headrest and the back portion of the body, safety belts of the seat being positionable within each of the recesses.

* * * * *